United States Patent [19]

Fuhrmann et al.

[11] 3,904,610

[45] Sept. 9, 1975

[54] METHOD OF PREPARING AN α-AMINO-ω-LACTAM

[75] Inventors: Robert Fuhrmann, Morris Plains; John Pisanchyn, Morristown, both of N.J.

[73] Assignee: Allied Chemical Corporation, New York, N.Y.

[22] Filed: Nov. 22, 1974

[21] Appl. No.: 526,281

[52] U.S. Cl. .............. 260/239.3 R; 260/239.3 A; 260/293.86; 260/326.5 FL
[51] Int. Cl.² ...... C07D 223/12; C07D 211/76; C07D 207/26
[58] Field of Search... 260/239.3 R, 239.3 A, 293.86, 260/326.5 FL

[56] References Cited
UNITED STATES PATENTS 3,641,003   2/1972   Ito et al. ...................... 260/239.3 R

*Primary Examiner*—Norma S. Milestone
*Assistant Examiner*—Robert T. Bond
*Attorney, Agent, or Firm*—Roger H. Criss; Arthur J. Plantamura

[57] ABSTRACT

There is provided an improved method of producing an α-amino-ω-lactam of the formula

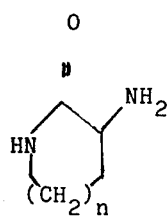

by the Beckmann rearrangement of an α-aminocycloalkanone oxime of the formula

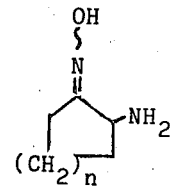

wherein $n$ is an integer between 0 and 12, the improvement comprising the steps of:

1. dissolving, in a first reaction step, the oxime or a mixture containing the oxime and an acid salt thereof, and $NH_4Cl$ in sulfuric acid having a concentration of about 100 to 110% (i.e., water-free sulfuric acid containing up to 45% by weight of free $SO_3$) while maintaining a temperature in the first reaction step in the range of about −5° to 35°C;

2. removing the evolved HCl gas formed in the first reaction step;

3. adding, in a second reaction step the solution from the first reaction step to sulfuric acid of a concentration of about 100 to 110% or to a Beckmann rearrangement mixture derived from said oxime containing sulfuric acid of such concentration while maintaining a temperature in said second reaction step below about 100°C by cooling, the rate of addition of the solution and the amount of cooling being adjusted to maintain the temperature in said range, whereby a rearrangement mixture is formed;

4. removing the evolved HCl gas formed in the second reaction step; and 5. stripping residual HCl from the rearrangement mixture, whereby a lactam solution substantially free of HCl is formed.

12 Claims, No Drawings

METHOD OF PREPARING AN α-AMINO-ω-LACTAM

BACKGROUND OF THE INVENTION

1. Field of the Invention

This invention relates to a process of preparing an α-amino-ω-lactam by the Beckmann rearrangement of an α-amino-cycloalkanone oxime. The invention is particularly applicable to the Beckmann rearrangement of α-aminocyclohexanone oxime to α-amino-γ-caprolactam.

2. Description of the Prior Art

It is known that α-amino-ω-lactams are obtained by the Beckmann rearrangement of an α-aminocycloalkanone oxime. As the Beckmann reagent (transposition agent) in such rearrangement, there has been suggested sulfuric acid, fuming sulfuric acid, chlorosulfonic acid, sulfur trioxide, liquid $SO_2$ containing $SO_3$, polyphosphoric acid optionally containing catalytic amounts of hydrochloric acid, mixtures containing sulfuric and hydrochloric acid and the like. For example, it is known that α-amino-ε-caprolactam ("ACL") is formed by the Beckmann rearrangement of α-amino-cyclohexanone oxime ("ACO") free base or its salt utilizing the above reagents. The ACL so formed can be utilized to prepare the basic amino acid lysine, which is an excellent protein supplement and demand for which has been increasing rapidly.

The ACO to be rearranged may be produced by several processes such as direct amination of the dimer of chloro-nitrosocyclohexane or the amination of 2-chlorocyclohexanone in the presence of hydroxylamine. Both of these reactions produce ACO free base as well as $NH_4Cl$ by-product plus impurities. It has heretofore been considered necessary that the $NH_4Cl$ must either be removed from the ACO free base prior to the Beckmann rearrangement reaction or the ACO-$NH_4Cl$ mixture must be converted via an exchange reaction to ACO hydrochloride (ACO.HCl) and ammonia which is separated from the system.

It has been postulated that only the syn- form of the ACO is rearranged to α-amino-ε-caprolactam and that the anti-form is rearranged to ε-amino-ε-caprolactam, which is not the desired product for use in the production of lysine and complicates purification of such desired product. ACO and other α-aminocycloalkanone oximes exist as the anti- and syn- form of the isomer, depending upon the relative position of the —OH radical to that of the amino radical as shown below:

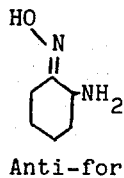
Anti-form

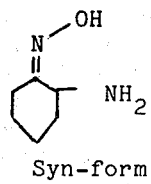
Syn-form

The syn-isomer has never been isolated and its physical properties are still unknown.

It has been suggested in Japanese patent publication 48-10788 (1973) to carry out the Beckmann rearrangement of ACO to ACL by first converting the anti-form of ACO to the syn- form in sulfuric acid to form the syn- form of ACO-sulfate exclusively and then heating the reaction mixture to obtain the desired Beckmann rearrangement. That is, the Beckmann rearrangement process therein suggested comprises a three-step process: first, dissolving the ACO in at least 3 moles of sulfuric acid of a concentration of 100–105% maintained at a temperature of 0° to 60°C, second, holding the liquid at such temperature for a long contact time (1 to 2 hours) and third, heating the liquid, for example, to 80°C for 40 minutes, to obtain the rearranged product. The rearranged product is thereafter neutralized, ACL is extracted out with ethanol and is converted to ACL hydrochloride which crystallizes out.

However, it has been found that in carrying out the third step of such process, that is heating of the cold sulfuric acid solution, an uncontrollable exotherm occurs. For instance, a temperature of over 120°C is reached within a few seconds even with cooling. Consequently, this suggested process does not appear to be commercially attractive due to the large cooling requirements and danger of explosion. Moreover, the relatively long low temperature contact time and the separation of the ACO in its free base or salt form from $NH_4Cl$ (as explained above) are further process disadvantages.

Additionally, as mentioned above, subsequent to the Beckmann rearrangement of α-aminocycloalkanone oximes, such as ACO, the resulting mixture is conventionally neutralized (e.g., with ammonia) to form the free base lactam, ACL in the case of ACO, along with ammonium sulfate by-product, and the ACL is separated by extraction or like procedures, with the ammonium sulfate being filtered off. The by-product ammonium sulfate has commercial value as a fertilizer but such value is diminished for certain uses if the sulfate salt is contaminated by ammonium chloride. It has been found that the ammonium sulfate by-product formed by neutralizing the resulting reaction product of the aforesaid Japanese publication contains undesirable amounts of $NH_4Cl$. Moreover, the $NH_4Cl$ so formed may interfere with the subsequent extraction of ACL.

Summary of the Invention

In accordance with this invention, there is provided an improved method of producing an α-amino-ω-lactam of the formula

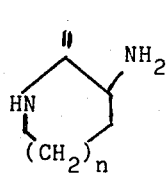

by the Beckmann rearrangement of an α-aminocycloalkanone oxime of the formula

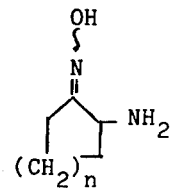

wherein n is an integer between 0 and 12, the improvement comprising the steps of:

1. dissolving, in a first reaction step, the oxime or a mixture containing the oxime and an acid salt thereof, and NH₄Cl in sulfuric acid having a concentration of about 100 to 110% (i.e., water-free sulfuric acid containing up to 45% by weight of free SO₃) while maintaining a temperature in the first reaction step in the range of about −5° to 35°C;

2. removing the evolved Hcl gas formed in the first reaction step;

3. adding, in a second reaction step, the solution from the first reaction step to sulfuric acid of a concentration of about 100 to 110% or to a Beckmann rearrangement mixture derived from said oxime containing sulfuric acid of such concentration while maintaining a temperature in said second reaction step below about 100°C by cooling, the rate of addition of the solution and the amount of cooling being adjusted to maintain the temperature in said range, whereby a rearrangement mixture is formed;

4. removing the evolved HCl gas formed in the second reaction step; and 5. stripping residual HCl from the rearrangement mixture, whereby a lactam solution substantially free of HCl is formed.

The process of this invention provides a manner of obtaining an α-amino-ω-lactam, such as ACL, which is substantially free of HCl, does not require purification of the oxime in that the oxime in its crude form (that is, together with NH₄Cl and optionally with its hydrochloride) can be employed in the rearrangement reaction, does not require a separate low temperature reaction step, provides a controllable high temperature rearrangement step and a substantially chloride-free ammonium sulfate by-product. Accordingly, the present invention provides a more economical route to the production of α-amino-ω-lactams from α-aminocycloalkanone oximes than heretofore suggested.

Description of the Preferred Embodiments

The starting material for the process of the invention is an α-aminocycloalkanone oxime of the formula

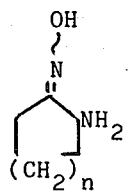

wherein n is an integer from 0 to 12, preferably 1 to 8 and most preferably 2 (i.e., α-aminocyclohexanone oxime). The oxime need not be separated into its syn- or anti- forms and a separate process step for isomerization from anti- to syn- is not required; the designation

in the above formula is intended to denote either form of the isomer. Salts of the oxime may be employed in addition to the free base form. Such salts include the hydrochloride, sulfate, acetate and other acid salts. The oxime is preferably in its free base form or admixed with its hydrochloride form. Examples of such oximes include α-aminocyclopentanone, α-aminocyclohexanone, α-aminocycloheptanone, α-aminocyclooctanone, α-aminocyclononanone, α-aminocyclodecanone, α-aminocycloundecanone and α-aminocyclododecanone oximes and the like. These oximes may be prepared by conventional procedures, such as direct amination of the corresponding chloronitrosocycloalkane dimer, as disclosed, for example, in British Pat. No. 1,279,906 or amination of the corresponding chlorocycloalkanone in the presence of hydroxylamine as disclosed, for example, in U.S. Pat. No. 3,426,070. Both of these procedures produce the oxime in its free base form, NH₄Cl by-product and impurities; the oxime may be converted to its hydrochloride form by the exchange reaction in aqueous medium:

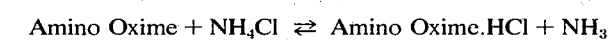

The oxime in its free base form together with NH₄Cl is herein referred to as crude oxime. Crude oxime without purification may be directly utilized in the Beckmann rearrangement process of this invention and it is preferred to utilize such material. It should be understood, however, that the oxime may be alternatively be first separated from NH₄Cl but that such purification is not required in the present process.

The mol ratios of the NH₄Cl to the oxime used herein are in the range of about 0.3 to 2, preferably about 0.5 to 1, mols of NH₄Cl per mol of oxime. When the mol ratio is below about 0.3:1, or above about 2:1, the yield is substantially reduced.

The oxime and the NH₄Cl together as a mixture or separately, if desired, is added to a first reaction stage, which comprises one or more reactors constructed of suitable inert material such as glass, stainless steel, glass-lined steel and the like. The first reaction stage contains sulfuric acid of a concentration in the range of about 100 to 110%, preferably about 100.5 to 103% and is cooled by suitable cooling means. At concentrations below about 100% the yield is substantially reduced whereas at concentrations above about 110%, undesirable side reactions occur and recovery of HCl is difficult. The oxime and the NH₄Cl are dissolved in the sulfuric acid with the temperature being maintained in the range of about −5° to 35°C, preferably about −5° to 20°C. At this temperature, the rearrangement reaction occurs only relatively slowly. Upon dissolution, hydrogen chloride gas is evolved from the solution. The reactor(s) is provided with a vent or other opening through which the evolved gas is removed and recovered.

The amount of oxime/NH₄Cl added to the sulfuric acid may be such as to provide from about 3 to 10, preferably about 3.5 to 8.5 mols of H₂SO₄ per mol of the oxime. The resulting solution is added within a short period of time, preferably immediately, after its formation to a second reaction stage since it has been found that there is no advantage in maintaining the oxime/NH₄Cl solution at the low temperature for any appreciable length of time. The solution may be added to the next reaction stage within a short period of time, with no additional residence time, if desired.

The second reaction stage may comprise one or more reactors which contain sulfuric acid or a rearrangement mixture comprising the oxime salts, HCl, NH₄⁺ ions, sulfuric acid and rearrangement products (including the aminolactam acid salt). In either case, the second reaction stage contains sulfuric acid. The use of a rearranged mixture is especially advantageous when carrying out the process of this invention on a continuous basis whereas the use of sulfuric acid alone may be advantageous for batch processes. The sulfuric acid concentration in the second reaction stage should likewise be in the range of about 100 to 110%, preferably 100.5 to 103%. Additional sulfuric acid may be added to a previous rearrangement mixture so that the mol ratio of the oxime to $H_2SO_4$ is within the desired range in the second reaction stage. It is again desired that this mol ratio should be in the range of about 3 to 10, preferably about 3.5 to 8.5, mols of $H_2SO_4$ per mol of the oxime for the rearrangement to occur. The second reaction stage is maintained at a maximum temperature of about 100°C, preferably about 50° to 100°C, more preferably about 60° to 90°C. by conventional cooling means. If the temperature exceeds 100°C, excessive foaming and yield loss occurs. Temperatures below about 50°C can be employed but are not generally desirable since the rearrangement reaction is slower.

The rate of addition of the solution from the first reaction stage to the second reaction stage and the rate of cooling of the second reaction stage are adjusted to maintain the desired temperatures. The reactor(s) of the second reaction stage is also fitted with a vent or other opening and is constructed of the same or similar materials mentioned with respect to the reactors of the first reaction stage. Hydrogen chloride gas is also evolved during the rearrangement reaction and it is removed from the reactor(s) through the vent or opening and is recovered.

The contact time in the second reaction stage is also fairly short and depends upon the temperature employed, the mol ratios, and other factors, but is generally sufficient to effect at least about 99% conversion to the lactam. Preferably, reaction times are in the range of about 2 minutes to 3 hours, more preferably about 10 to 60 minutes. The Beckmann rearrangement reaction occurs very fast; for example, at 50°C, the reaction time may be in the range of about 15 minutes. At 80°C, the reaction time is less than about 5 minutes.

The total amount of HCl removed from the first and second reactors generally ranges from about 0.5 to 0.8 mols of HCl per mol of ACL.

Following rearrangement in the second reaction stage, the liquid containing the rearranged mixture of the lactam (as a sulfate salt), $NH_4^+$ ions, residual HCl and other by-products and impurities is fed to a stripping chamber wherein the residual HCl is stripped from the liquid. The stripping operation may be performed utilizing a vacuum or an inert gas such as nitrogen. Thin film or wiped film flash evaporators may be employed for this purpose.

The lactam solution that is obtained after the stripping operation is substantially free of HCl. By "substantially free" it is meant that there are less than about 0.15 mols of HCl per mol of lactam, preferably less than about 0.10 mols, more preferably less than about 0.05 mols, of HCl per mol of lactam in the solution. That is, substantially all of the the residual HCl present, about 0.2 to 0.5 mols per mol of ACL, is eliminated. The lactam in the resulting solution is in its acid salt form, such as the sulfate. The lactam in its free base form can be obtained by neutralizing with, for example, ammonia followed by separation utilizing extraction or the like procedures. For example, the lactam solution can be contacted with a solvent while simultaneously neutralizing with ammonia to form the free base lactam in such solvent. The free base can thereafter be obtained by conventional procedures such as crystallization, extraction, distillation and the like or it may be converted to a salt, such as the hydrochloride, by known procedures.

The yields of the free base amino lactam, based on the amount of the oxime to be rearranged, in accordance with the process of this invention are high, such as, for example, 85 to 98 percent.

In can be seen that the process of the present invention provides an efficient and economic manner for preparing $\alpha$-amino-$\omega$-lactams in high yields. Such high yields are obtainable without the need for separating ammonium chloride from the oxime or formation of the oxime hydrochloride. Hence, the evaporation of large quantities of water, the extraction of other impurities and the elimination of the last traces of moisture from the ACO.HCl crystals (attendant with the removal of ammonia during the exchange reaction) are not required. Moreover, in carrying out this process, there is better reaction control in the rearrangement reaction in that the strong exotherm of the prior art is avoided. Furthermore, the ammonium sulfate by-product that is obtained is more valuable than the dilute aqueous ammonia streams resulting from other suggested processes and the ammonium sulfate is not contaminated by ammonium chloride impurities. As pointed out above, the ACL formed in accordance with this invention can be used to prepare lysine.

To further describe the process of this invention, the following non-limiting examples are given.

EXAMPLE 1

Into a jacketed 100 cc flask fitted with a stirrer, thermometer, nitrogen gas inlet and charge port was added sulfuric acid of a concentration of 100 to 102.5%. The temperature was reduced by circulating cooled water through the jacket. While a stream of dry nitrogen gas was maintained in the flask, a mixture of ACO and ammonium chloride was added through a charging port in the flask with stirring. Evolved HCl gas was permitted to escape into a silicone oil bubbler. After a period of time to insure complete dissolution of the solids, the solution was added to a 100 cc flask connected to a bottom outlet of the first flask. The lower flask was provided with a magnetic bar stirrer and the temperature was controlled by an oil bath with any intermittent cooling provided by an ice bath. A desired amount of sulfuric acid was placed in the lower flask and brought to the desired temperature. Addition of the solution from the first flask was commenced under a dry nitrogen gas atmosphere with stirring. HCl gas evolved from the second flask was permitted to escape through a silicone oil bubbler. As the reaction is exothermic, within a short time cooling was required to maintain the desired temperature.

After the reaction was completed, residual HCl gas was eliminated from the reaction mixture by applying a vacuum to the second flask with continuous stirring. HCl flashing time was in the order of 30 to 60 minutes.

After completion of the HCl elimination stage, the reaction mixture was weighed and neutralized by gradual addition to a neutralization solvent containing approximately 2 mols of water per mol of ACL while continuously bubbling in an excess amount of anhydrous ammonia through the solution. The resulting slurry of ammonium sulfate was thoroughly stirred during the addition and the temperature was maintained at 20° to 45°C by cooling and controlling the rate of addition. The amount of solvent required in the neutralization step depended somewhat on the sulfuric acid/ACO ratio used in the rearrangement step, but the concentration of the resulting ACL solutions was about 4 to 15%. The neutralized slurries were than filtered and the inorganic salts reslurried with additional solvent to remove ACL still contained as mother liquor in the filter cake. Generally, three washes of 200 cc of solvent (per 50 millimol charge of ACO) were used. The washes were combined with the original filtrate and concentrated on a flash evaporator under a slight vacuum. Yields were determined by vapor chromatographic analysis and gravimetric determination of ACL.HCl.

The inorganic salts were dried and weighed and residual chorine ion was determined in the inorganic salt by potentiometric titration. The results are shown in Table 1, below. Comparative examples are shown in Table 2, below.

monium chloride and ACO, a reaction temperature of about 80°C and vacuum flashing of HCl at 0.5 to 15 mm Hg. The residual chloride ion in the inorganic salts was, respectively, 4.3, 0.7 and 2.0 mol percent based on the mols of ACL. Examples 4–6 show similar yields with reduced solubilization, addition and reaction times. Examples 7–10 demonstrate that high yields of ACL can be obtained with addition times to the Beckmann reactor ranging from 9 to 45 minutes.

Comparative Examples 11 and 14 (Table 2) show that yields are not increased by using ammonium chloride-free ACO feed (Example 11) and that the use of an ammonium chloride/ACO mol ratio higher than the claimed range dramatically reduces the yield (Example 14). Comparative Examples 12 and 13 (as well as Example 11) show that an isomerization period does not provide yields substantially increased over those of Examples 1–10 and hence is not required. Comparative Examples 15–17 demonstrate that without stripping HCl from the Beckmann reactor, residual chloride ion content in the inorganic salt by-product is, based on the

TABLE 1

| EXAMPLE NO. | 1 | 2 | 3 | 4 | 5 | 6 | 7 | 8 | 9 | 10 |
|---|---|---|---|---|---|---|---|---|---|---|
| Solubilization Temp.,°C | 8–10 | 8–10 | 10–15 | 12–17 | 10–14 | 0 | 10–17 | 11–14 | 12–14 | 8–10 |
| Time, Hours* | 3.5 | 3.5 | 3.5 | 1.5 | 2.8 | 1.1 | 2.6 | 3.0 | 3.0 | 5.0 |
| Initial $H_2SO_4$/ACO Mol Ratio | 4.8 | 5.1 | 4.95 | 6.7 | 7.1 | 7.2 | 5.35 | 4.49 | 4.85 | 6.9 |
| $NH_4Cl$/ACO Mol Ratio | 1 | 1 | 1 | 1 | 1 | 1 | 1 | 1 | 1 | 1 |
| Addition Time to Reactor, Min. | 60 | 60 | 60 | 20 | 12 | 12 | 9 | 36 | 45 | 45 |
| Reaction Temp.,°C | 78–83 | 80–83 | 80±5 | 78–82 | 70–80 | 70–80 | 80±3 | 78±4 | 79±3 | 80±5 |
| Time, Min. | 40 | 40 | 40 | 42 | 20 | 42 | 42 | 42 | 42 | 42 |
| Final $H_2SO_4$/ACO Mol Ratio | 6.7 | 6.0 | 6.0 | 7.8 | 7.9 | 6.03 | 6.27 | 6.03 | 6.10 | 8.45 |
| HCl Flashing Temp.°C | 78–80 | 78–80 | 75–82 | 65 | 72.5 | 77 | none | none | none | none |
| Vacuum, mm Hg | 12–15 | ** | 12–15 | 0.5 | 0.5 | 5 | — | — | — | — |
| Flashing Time, Min. | 30 | 60 | 60 | 60 | 30 | 30 | — | — | — | — |
| Residual Cl ion, Mol % | 4.3 | 0.7 | 2.0 | — | — | — | — | — | — | — |
| ACL Yield, Mol % | 87 | 90 | 91 | 96.0 | 84.2 | 97.0 | 94.8 | 94.3 | 92.0 | 95.0 |
| Neutralization Solvent | iso-PrOH | Glyme | *** | Glyme | Glyme | Glyme | Glyme | Glyme | Glyme | Dioxane |

*Includes addition time of ACO + $NH_4Cl$ solids as well as time required to obtain clear solution.
**12–15 mm Hg for 15 min. and 0.5–1.0 mm Hg for 45 min.
***3 parts trichloroethylene to 1 part isopropanol.

TABLE 2

| EXAMPLE NO. | 11 | 12 | 13 | 14 | 15 | 16 | 17 |
|---|---|---|---|---|---|---|---|
| Solubilization Temp.°C. | 10–16 | 10–15 | 10–15 | 10–16 | 10–15 | 12–15 | 12–15 |
| Time, hours* | 2.3 | 1.5 | 3.0 | 5.7 | 3.0 | 4.0 | 4.2 |
| Initial $H_2SO_4$/ACO Mol Ratio | 5.09 | 4.09 | 5.16 | 6.67 | 7.0 | 4.67 | 4.0 |
| Isomerization Time, hours | 2.0 | 2.0 | 2.0 | none | 2.0 | 1.0 | none |
| Temp.°C. | 10–16 | 10–16 | 10–15 | — | 10–15 | 12–15 | — |
| $NH_4Cl$/ACO Mol Ratio | 0 | 0.5 | 1 | 3.0 | 1 | 1 | 1 |
| Addition Time to Reactor, min. | 15 | 30 | 30 | 30 | none | 45 | 80 |
| Reaction Temp.,°C. | 79.5±2.5 | 79.5±2.5 | 82.5±2.5 | 79.5±2.5 | 22–26 | 46±2 | 90–95 |
| Time, min. | 42 | 42 | 42 | 42 | 1140 | 70 | 42 |
| Final $H_2SO_4$/ACO Mol Ratio | 6.72 | 6.44 | 7.03 | 8.18 | 7.01 | 6.9 | 5.10 |
| Residual Chloride Ion, Mol % | — | — | — | — | 47.6 | 37.6 | 18.4 |
| ACL Yield, Mol % | 86.1 | 91.8 | 91.6 | 64.0 | 90.8 | 96.0 | 90.0 |

*Includes addition time of ACO + $NH_4Cl$ solids as well as time required to obtain a clear solution. Neutralization solvent for Examples 11–17 was glyme.

The results shown in Table 1 demonstrate the high yields of ACL that can be obtained while providing an ammonium sulfate by-product containing a minimum amount of ammonium chloride. Examples 1, 2 and 3 show that yields of 87, 90 and 91 mol percent, respectively, of ACL can be obtained without an isomerization step and by utilizing an equimolar mixture of ammols of ACL, 47.6 mol percent at a reaction temperature of about room temperature, 37.6 mol percent at about 46°C and is still 18.4 mol percent when the reaction temperature is raised to 90°–95°C (Example 17). However, in Example 17, heavy degassing was observed. The residual chloride ion content of Examples 15–17 is dramatically higher than that of Examples 1–3 wherein HCl was eliminated from the Beckmann reactor.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

We claim:
1. In a method of producing an α-amino-ω-lactam of the formula

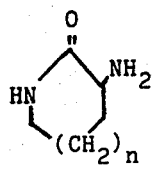

by the Beckmann rearrangement of an α-aminocycloalkanone oxime of the formula

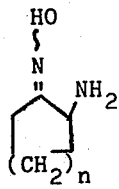

wherein $n$ is an integer between 0 and 12, the improvement comprising the steps of
1. dissolving, in a first reaction step, said oxime or a mixture containing said oxime and an acid salt thereof, and $NH_4Cl$ in sulfuric acid of a concentration of about 100 to 110% while maintaining a temperature in said first reaction step in the range of about −5° to 35°C;
2. removing the evolved HCl gas formed in said first reaction step;
3. adding, in a second reaction step, the solution from said first reaction step to sulfuric acid of a concentration of about 100 to 110% or to a Beckmann rearrangement mixture derived from said oxime containing sulfuric acid of said concentration while maintaining a temperature in said second reaction step below about 100°C by cooling, the rate of addition of said solution from said first reaction step and the amount of cooling being adjusted to maintain said temperature in said range, whereby a rearrangement mixture is formed;
4. removing the evolved HCl gas from said second reaction step; and
5. stripping residual HCl from said rearrangement mixture whereby a lactam solution substantially free of HCl is formed.

2. The process of claim 1 wherein said second reaction step comprises adding said solution to said Beckmann rearrangement mixture.

3. The process of claim 1 wherein said temperature in said second reaction step is maintained in the range of about 50° to 100°C.

4. The process of claim 1 wherein said oxime and ammonium chloride are added in said first step to said sulfuric acid as a mixture, said mixture resulting from the preparation of said oxime without separation of the ammonium chloride produced in said preparation.

5. The process of claim 1 wherein n is an integer from 1 to 8.

6. The process of claim 1 wherein said α-aminocycloalkanone oxime is α-aminocyclohexanone oxime and said α-amino-ω-lactam is α-amino-ε-caprolactam.

7. The process of claim 4 wherein said α-aminocycloalkanone oxime is α-aminocyclohexanone oxime and said α-amino-ω-lactam is α-amino-ε-caprolactam.

8. The process of claim 1 wherein the mol ratio of said oxime to ammonium chloride which is added in said first reaction step is in the range of about 0.5 to 2 mols of $NH_4Cl$ per mol oxime.

9. The process of claim 1 wherein the mol ratio in said second reaction step of sulfuric acid to said oxime is in the range of about 3 to 10.

10. The process of claim 1 wherein the contact time in said second reaction step is sufficient to convert about 99% of said oxime to said lactam.

11. The process of claim 1 wherein said residual HCl is stripped by vacuum or gas stripping.

12. The process of claim 1 wherein said temperature in said first reaction step is in the range of about −5° to 25°C.

* * * * *